United States Patent
Hecker et al.

(10) Patent No.: US 11,787,378 B2
(45) Date of Patent: Oct. 17, 2023

(54) CONTROL APPARATUS FOR CONTROLLING A BRAKE SYSTEM FOR A VEHICLE, BRAKE SYSTEM FOR A VEHICLE, METHOD FOR OPERATING A CONTROL APPARATUS AND METHOD FOR APPLYING BRAKE PRESSURE TO AT LEAST ONE BRAKE DEVICE OF A BRAKE SYSTEM FOR A VEHICLE

(71) Applicant: KNORR-BREMSE SYSTEME FUER NUTZFAHRZEUGE GMBH, Munich (DE)

(72) Inventors: Falk Hecker, Markgroeningen (DE); Friedbert Roether, Cleebronn (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 499 days.

(21) Appl. No.: 16/069,255

(22) PCT Filed: Jan. 13, 2017

(86) PCT No.: PCT/EP2017/050663
§ 371 (c)(1),
(2) Date: Jul. 11, 2018

(87) PCT Pub. No.: WO2017/121849
PCT Pub. Date: Jul. 20, 2017

(65) Prior Publication Data
US 2021/0039617 A1    Feb. 11, 2021

(30) Foreign Application Priority Data
Jan. 14, 2016  (DE) .................... 10 2016 100 526.6

(51) Int. Cl.
*B60T 13/68* (2006.01)
*B60T 8/171* (2006.01)

(52) U.S. Cl.
CPC .............. *B60T 13/68* (2013.01); *B60T 8/171* (2013.01); *B60T 13/683* (2013.01)

(58) Field of Classification Search
CPC ........ B60T 8/323; B60T 8/3235; B60T 8/342; B60T 8/362; B60T 8/4818; B60T 13/268; B60T 13/683; B60T 13/68; B60T 8/171
See application file for complete search history.

(56) References Cited

U.S. PATENT DOCUMENTS 3,894,556 A * 7/1975 Pareja ................... F16K 15/044
                                                                137/539
5,061,015 A * 10/1991 Cramer ................. B60T 13/683
                                                                303/7

(Continued)

FOREIGN PATENT DOCUMENTS

CN      102143868 A     8/2011
CN      203958124 U    11/2014

(Continued)

OTHER PUBLICATIONS

International Search Report dated May 4, 2017 of the corresponding International Application PCT/IB2017/050663 filed Jan. 13, 2017.

*Primary Examiner* — Bradley T King
(74) *Attorney, Agent, or Firm* — NORTON ROSE FULBRIGHT US LLP; Gerard Messina

(57) ABSTRACT

A control apparatus for controlling a brake system for a vehicle, including: an actuable control valve for loading at least one brake device of the brake system with a brake pressure; a pressure container connector for connecting the control apparatus to a pressure container to provide a supply pressure; and a pressure limiting valve which is arranged or can be arranged between the control valve and the pressure (Continued)

container connector to limit the supply pressure to the brake pressure. Also described are a related brake system, a method for operating, a method for loading, a control unit, and a computer readable medium.

10 Claims, 3 Drawing Sheets

(56) References Cited

U.S. PATENT DOCUMENTS

| | | | | |
|---|---|---|---|---|
| 5,342,119 | A * | 8/1994 | Smith | B60T 8/342 303/113.2 |
| 5,353,834 | A * | 10/1994 | Schmitt | B60T 8/341 137/539.5 |
| 5,445,440 | A * | 8/1995 | Plantan | B60T 13/265 303/7 |
| 5,458,402 | A * | 10/1995 | Jeffery | B60T 13/268 303/13 |
| 5,655,819 | A * | 8/1997 | Emig | B60T 8/5081 303/116.1 |
| 6,149,246 | A * | 11/2000 | Terborn | B60G 17/0523 280/124.16 |
| 6,702,400 | B1 * | 3/2004 | Eberling | B60T 7/12 303/6.1 |
| 7,517,026 | B1 * | 4/2009 | Herbst | B60T 7/20 303/113.4 |
| 7,690,735 | B2 * | 4/2010 | Bennett | B60T 13/662 303/9.66 |
| 8,979,217 | B2 | 3/2015 | Steinberger et al. | |
| 10,576,946 | B2 * | 3/2020 | Gomes | B60T 8/266 |
| 2002/0036428 | A1 * | 3/2002 | Jacob | B60T 13/263 303/9.73 |
| 2005/0061372 | A1 * | 3/2005 | McGrath | F16K 15/044 137/539.5 |
| 2015/0375720 | A1 * | 12/2015 | Leoka | B60T 8/1766 303/127 |
| 2018/0215364 | A1 * | 8/2018 | Tione | B60T 8/1893 |
| 2018/0236984 | A1 * | 8/2018 | Gomes | B60T 7/22 |
| 2018/0347716 | A1 * | 12/2018 | Blochlinger | F16K 15/048 |
| 2019/0193706 | A1 * | 6/2019 | Roether | F16K 31/426 |

FOREIGN PATENT DOCUMENTS

| | | |
|---|---|---|
| DE | 4309465 A1 | 9/1994 |
| DE | 102006018554 B3 | 1/2008 |
| DE | 102010005091 A1 | 7/2011 |
| DE | 102013107805 A1 | 1/2015 |
| DE | 102014002614 A1 | 8/2015 |
| EP | 1036718 A2 | 9/2000 |
| EP | 1923284 A2 | 5/2008 |
| RU | 2537221 C2 | 3/2013 |

* cited by examiner

CONTROL APPARATUS FOR CONTROLLING A BRAKE SYSTEM FOR A VEHICLE, BRAKE SYSTEM FOR A VEHICLE, METHOD FOR OPERATING A CONTROL APPARATUS AND METHOD FOR APPLYING BRAKE PRESSURE TO AT LEAST ONE BRAKE DEVICE OF A BRAKE SYSTEM FOR A VEHICLE

FIELD OF THE INVENTION

The present invention relates to a control apparatus for controlling a brake system for a vehicle, to a brake system for a vehicle, to a method for operating a control apparatus, to a corresponding control unit, and to a method for loading at least one brake device of a brake system for a vehicle with a brake pressure.

BACKGROUND INFORMATION

A pneumatic brake system for a commercial vehicle can comprise a storage container for providing a supply pressure. Said supply pressure can be reduced, for example, by a pressure limiter to a suitable operating pressure for operating the brake system.

SUMMARY OF THE INVENTION

Against said background, the present approach provides a control apparatus for controlling a brake system for a vehicle, a brake system for a vehicle, a method for operating a control apparatus, a control unit, furthermore, which uses said method, a corresponding computer program, and finally a method for loading at least one brake device of a brake system for a vehicle with a brake pressure in accordance with the main claims. Advantageous developments and improvements of the apparatus which is specified herein are possible by way of the measures which are also described herein.

A control apparatus for controlling a brake system for a vehicle is proposed, the control apparatus having the following features:
a (for example, electrically) actuable control valve for loading the brake system with a brake pressure;
a pressure container connector for connecting the control apparatus to a pressure container for providing a supply pressure; and
a pressure limiting valve which is arranged or can be arranged between the control valve and the pressure container connector for limiting the supply pressure to the brake pressure.

A brake system can be understood to mean, for example, a pneumatically or hydraulically or both pneumatically and hydraulically actuable brake system. The vehicle can be, for instance, a commercial vehicle or a rail vehicle. The control valve can be, for example, a directional valve with at least two switching positions. In particular, the control valve can be configured as a solenoid valve with at least one coil. Here, the control valve can be, for instance, part of a relay unit. A brake pressure can be understood to mean an operating pressure for actuating the brake system. The pressure limiting valve can be, for example, a shut-off or pressure valve. In particular, the pressure limiting valve can be realized as a check valve.

The approach which is proposed here is based on the finding that a brake system for a vehicle can be actuated automatically with a reduced brake pressure by way of the combination of a (for example, electrically) actuable control valve with a pressure limiting valve. In this way, the brake system can be used in conjunction with storage containers which are filled with high pressures. This in turn has the advantage that the storage containers can be of small and correspondingly space-saving configuration.

In accordance with one embodiment, the pressure limiting valve can be realized as a check valve, in particular as a spring-loaded check valve. As a result, the pressure limiting valve can be provided in a particularly inexpensive manner.

Furthermore, it is advantageous if the control valve is realized as a solenoid valve, in particular as a spring-returned solenoid valve. As a result, the control valve can be configured to be as wear-resistant as possible.

In accordance with a further embodiment, the control apparatus can have a brake device connector for connecting the control apparatus to at least one brake device of the brake system. The pressure limiting valve can have a control valve connector for connecting the pressure limiting valve to the control valve. Here, the control valve can be configured to connect the control valve connector and the brake device connector to one another fluidically in an operating position. In addition or as an alternative, the control valve can be configured to disconnect the control valve connector and the brake device connector from one another fluidically in a rest position. As a result, the brake system can be actuated with low mechanical complexity.

In addition, it is advantageous if the control valve is configured to shut off the control valve connector in the rest position. In addition or as an alternative, the control unit can be configured to open the brake device connector in the rest position. As a result, the reliability of the control apparatus can be increased.

In accordance with a further embodiment, the control apparatus can have an actuating device connector for connecting the control apparatus to an actuating device for actuating the brake system by way of a driver of the vehicle. Here, the control valve can be configured to connect the actuating device connector and the brake device connector to one another fluidically in the rest position. In addition or as an alternative, the control valve can be configured to disconnect the actuating device connector and the brake device connector from one another fluidically in the operating position. An actuating device can be understood to mean, for example, a brake pedal or a brake lever. As a result, the control apparatus can be coupled to the actuating device.

Furthermore, the control valve can be configured to shut off the actuating device connector in the operating position. As a result, loading of the brake device with the brake pressure by the actuating device can be prevented if the brake device is loaded with the brake pressure via the pressure limiting valve.

Furthermore, the approach which is proposed here provides a brake system for a vehicle, the brake system having the following features:
at least one pressure container for providing a supply pressure; and
a control apparatus in accordance with one of the preceding embodiments which is connected to the pressure container.

In addition, the approach which is proposed here provides a method for operating a control apparatus in accordance with one of the preceding embodiments, the method comprising the following steps:
reading of a sensor signal which is provided by at least one sensor of the vehicle; and generating of an actuating signal for actuating the control valve using the sensor signal.

The sensor signal can be, for example, a signal which has been provided in conjunction with a driver assistance system of the vehicle, for instance a traction control system (ASR), an electronic stability program (ESP) or an autonomous cruise control system (ACC).

Furthermore, the approach which is described here provides a method for loading at least one brake device of a brake system for a vehicle with a brake pressure, the brake system comprising a control apparatus with an electrically actuable control valve, a pressure container connector for connecting the control apparatus to a pressure container, and a pressure limiting valve which is arranged between the control valve and the pressure container connector, the method comprising the following steps:

providing of a supply pressure at the pressure container connector;
limiting of the supply pressure to the brake pressure by way of the pressure limiting valve; and
actuating of the control valve to load the brake device with the brake pressure.

Furthermore, the approach which is proposed here provides a control unit which is configured to carry out, actuate or implement the steps of one variant of a method which is proposed here in corresponding devices. The object on which the invention is based can also be achieved rapidly and efficiently by way of said design variant of the invention in the form of a control unit.

In the present case, a control unit can be understood to mean an electric unit which processes sensor signals and outputs control and/or data signals in a manner which is dependent on said sensor signals. The control unit can have an interface which can be configured using hardware and/or software. In the case of a configuration using hardware, the interfaces can be, for example, part of what is known as a system ASIC which comprises a very wide variety of functions of the control unit. It is also possible, however, that the interfaces are dedicated, integrated circuits or consist at least partially of discrete components. In the case of a configuration using software, the interfaces can be software modules which are present, for example, on a microcontroller in addition to other software modules.

A computer program product or computer program with program code which can be stored on a machine-readable carrier or storage medium such as a semiconductor memory, a hard disk or an optical memory is also advantageous, and is used for carrying out, implementing and/or actuating the steps of the method in accordance with one of the above-described embodiments, in particular if the program product or program is carried out on a computer or an apparatus.

Exemplary embodiments of the invention are shown in the drawings and are described in greater detail in the following description.

In the following description of favorable exemplary embodiments of the present invention, identical or similar designations are used for the elements which are shown in the different figures and which have a similar effect, a repeated description of said elements being dispensed with.

DETAILED DESCRIPTION

Figure 1:
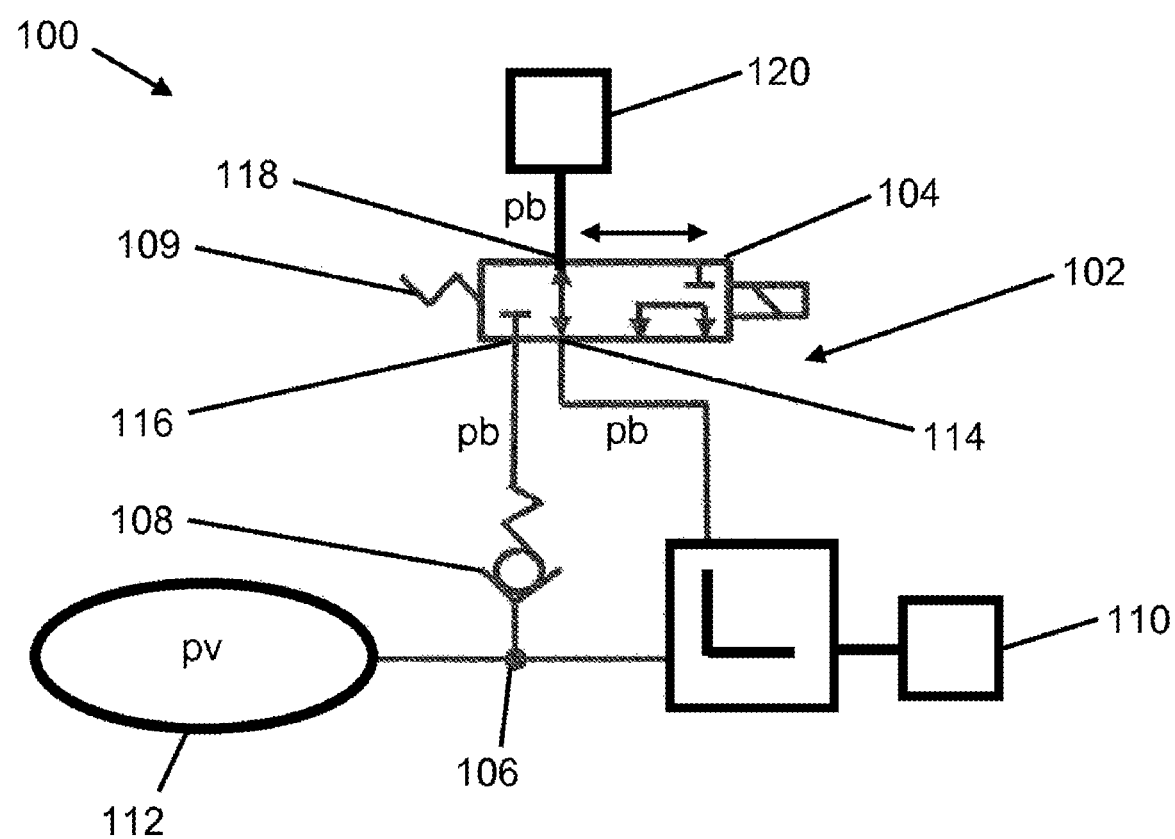
FIG. 1 shows a diagrammatic illustration of a brake system in accordance with one exemplary embodiment.

FIG. 1 shows a diagrammatic illustration of a brake system 100 in accordance with one exemplary embodiment of the present invention. The brake system 100 is configured to brake a vehicle, in particular a commercial vehicle. The brake system 100 comprises a control apparatus 102 with an electrically actuable control valve 104, a pressure container connector 106 and a pressure limiting valve 108 which is arranged between the control valve 104 and the pressure container connector 106. The control valve 104 (here, a solenoid valve which can be returned by a spring 109) is configured to forward a brake pressure pb to a brake device 110 of the brake system 100. The control valve 104 is, for example, a relay valve for traction control. The brake device 110 is, for example, an ABS valve or a brake cylinder. The pressure container connector 106 serves to connect a pressure container 112 to the control apparatus 102. Via the pressure container connector 106, the control apparatus 102 can be loaded with a supply pressure pv which is provided by way of the pressure container 112. The pressure limiting valve 108 (here, a spring-loaded check valve) is configured to reduce the supply pressure pv which prevails at the pressure container connector 106 to the brake pressure pb. The control valve 104 can therefore be loaded with the brake pressure pb via the pressure limiting valve 108.

In accordance with this exemplary embodiment, the control apparatus 102 is realized with a brake device connector 114, via which the control apparatus 102 is connected to the brake device 110. The pressure limiting valve 108 is likewise realized with a control valve connector 116, via which the pressure limiting valve 108 is connected to the control valve 104. Depending on the exemplary embodiment, the pressure limiting valve 108 can be realized as part of a supply line of the brake system 100, which supply line connects the pressure container 102 to the control valve 104. The control valve 104 is configured to be moved between an operating position and a rest position by way of corresponding actuation. In the rest position (shown in FIG. 1) of the control valve 104, in which rest position the spring 109 has, for example, a greater length than in the operating position, the control valve connector 116 is disconnected fluidically from the brake device connector 114. In the operating position, in contrast, the control valve connector 116 and the brake device connector 114 are connected to one another fluidically by way of the control valve 104, with the result that the brake pressure pb which is provided by way of the pressure limiting valve 108 is forwarded to the brake device 110 via the control valve 104. As a result, the brake device 110 is loaded with the brake pressure pb and is actuated correspondingly.

The control valve 104 is optionally configured to shut off the control valve connector 116 in the rest position in such a way that forwarding of the brake pressure pb to the brake device connector 114 is prevented. In accordance with the exemplary embodiment which is shown in FIG. 1, the control valve 104 is additionally configured to open the brake device connector 114 at the same time as the control valve connector 116 is shut off.

In addition, the control apparatus 102 which is shown in FIG. 1 is realized with an optional actuating device connector 118, to which an actuating device 120 of the brake system 100, for instance a foot actuating unit in the form of a foot brake valve, is connected. The actuating device 120 is configured to output the brake pressure pb. To this end, the actuating device 120 is realized, for example, with a corresponding pressure limiting arrangement for limiting a pressure which is generated by way of actuation of the actuating device 120 to the brake pressure pb. The control valve 104 is configured to connect the actuating device connector 118 to the brake device connector 114 fluidically in the rest position, with the result that the brake pressure pb which is provided by the actuating device 120 is forwarded to the brake device 110. The actuating device connector 118 is optionally shut off by way of the control valve 104 in the operating position. As a result, the supply pressure pv can be limited to the brake pressure pb even in the case of an automatic brake operation, for instance for traction control or in the case of an ESP intervention. Pressure limiting in the context of an automatic brake operation can additionally be realized very inexpensively by way of the pressure limiting valve 108.

For example, the brake pressure pb can lie between 8 and 10 bar, and the supply pressure pv can lie between 12 and 13 bar. The pressure container 112 can be of correspondingly small configuration as a result of the high supply pressure pv. The brake system 100 can be protected against an excessively high pressure by way of the pressure limiting valve 108.

The pressure limiting function can be integrated into a relay valve, for example, with the aid of a spring-loaded check valve as pressure limiting valve 108, it being possible for the pressure limiting valve 108 to be configured to open only above a pressure of, for example, 3 bar, with the result that a brake pressure pb of only 10 bar is led through at a supply pressure pv of, for example, 13 bar.

To this end, the pressure limiting valve 108 is arranged, for example, in a supply line of the control valve 104. The pressure limiting valve 108 opens, for example, only above a pressure of 3 bar, as a result of which 3 bar is deducted from the supply pressure pv in the case of the control valve 104 being switched on, whereby the output brake pressure pb is 3 bar lower than the supply pressure pv. Therefore, for example, a pressure of 9.5 bar can be used in the brake system 100 in the case of a supply pressure pv of 12.5 bar.

The pressure limiting valve 108 is integrated, for example, into a front or rear axle controller in the region of a store supply arrangement of a magnet assembly for traction control. It is therefore possible to output a supply pressure which is reduced by, for example, 3 bar via a traction control system (ASR), an electronic stability program (ESP) or an autonomous cruise control system (ACC). In order that the pressure limiting arrangement is active even in the case of normal actuation of the brake system 100, a suitable pressure limiting arrangement can also be installed in the region of the actuating device 120. As a result, greater gradients in the relay unit and shorter brake travels can be realized.

Furthermore, one exemplary embodiment (not shown pictorially in the figures) of what is proposed here is also conceivable, in the case of which exemplary embodiment the control valve 104 is separated into, for example, two separately actuable solenoid valves (for example, two 2/2-way solenoid valves) or comprises said solenoid valves. The duct 116 is then connected via the first 2/2 solenoid to the duct 114 via a normally closed first solenoid valve in the case of an energized state. The second solenoid valve which is, for example, normally open then connects the duct 118 to the duct 114 in the de-energized state. In the case of an energized state, said duct is closed.

Figure 2:
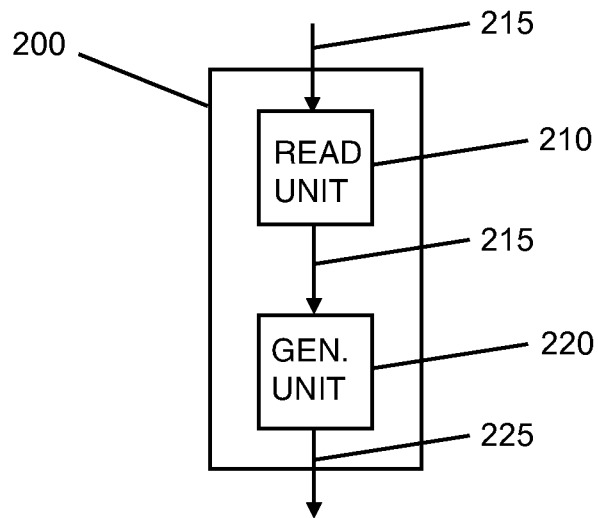
FIG. 2 shows a diagrammatic illustration of a control unit in accordance with one exemplary embodiment.

FIG. 2 shows a diagrammatic illustration of a control unit 200 in accordance with one exemplary embodiment. The control unit 200 can be used, for example, in conjunction with a control apparatus which is described in the preceding text using FIG. 1. The control unit 200 comprises a reading unit 210 for reading a sensor signal 215 which is provided by at least one sensor of the vehicle which is equipped with the control apparatus. The sensor signal 215 is, for example, a signal which is provided by way of an environmental, brake or steering sensor of the vehicle. Furthermore, the control unit 200 comprises a generating unit 220 which is configured to generate an actuating signal 225 for actuating the control valve of the control apparatus using the sensor signal 215.

Figure 3:
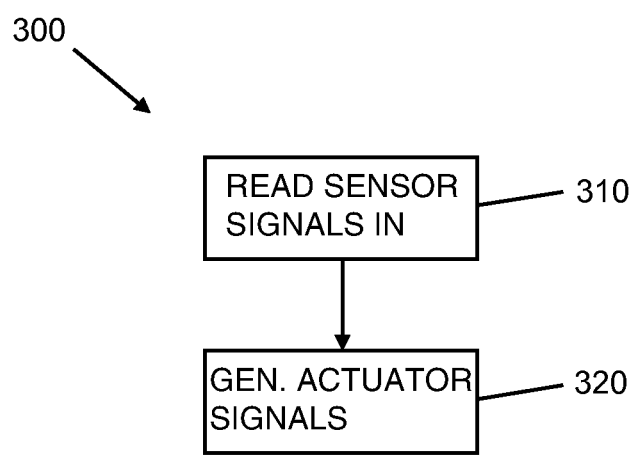
FIG. 3 shows a flow chart of a method for operating a control apparatus in accordance with one exemplary embodiment.

FIG. 3 shows a flow chart of a method 300 for operating a control apparatus in accordance with one exemplary embodiment. The method 300 can be carried out or actuated, for example, in conjunction with a control apparatus which is described in the preceding text using FIGS. 1 and 2. Here, the sensor signal which is provided by the sensor is read in a step 310. In a further step 320, the actuating signal for actuating the control valve is generated using the sensor signal.

Figure 4:
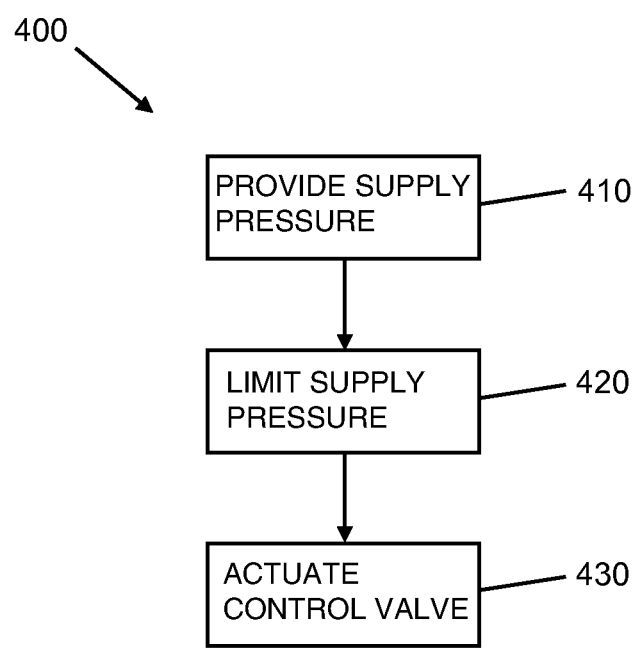
FIG. 4 shows a flow chart of one exemplary embodiment of a method for loading at least one brake device of a brake system with a brake pressure.

FIG. 4 shows a flow chart of one exemplary embodiment of a method 400 for loading at least one brake device of a brake system with a brake pressure. The method 400 can be carried out, for example, in conjunction with a brake system which is described in the preceding text using FIG. 1. The method 400 comprises a step 410, in which the supply pressure is provided to the pressure container connector. In a further step 420, the supply pressure is limited to the brake pressure by way of the pressure limiting valve. Finally, in a step 430, the control valve is actuated to load the brake device with the brake pressure.

If an exemplary embodiment comprises an "and/or" combination of a first feature and a second feature, this is to be interpreted in such a way that the exemplary embodiment in accordance with one embodiment has both the first feature and the second feature and, in accordance with a further embodiment, has either only the first feature or only the second feature.

LIST OF DESIGNATIONS

100 Brake system
102 Control apparatus
104 Control valve
106 Pressure container connector
108 Pressure limiting valve
109 Spring
110 Brake device
112 Storage container
114 Brake device connector
116 Control valve connector
118 Actuating device connector
120 Actuating device
200 Control unit
210 Reading unit
215 Sensor signal
220 Generating unit
225 Actuating signal
300 Method for operating a control apparatus
310 Step of reading 320 Step of generating
400 Method for loading a brake device with a brake pressure
410 Step of providing
420 Step of limiting
430 Step of actuating

The invention claimed is:

1. A control apparatus for controlling a brake system for a vehicle, comprising:
   an electrically actuable control valve for loading at least one brake device of the brake system with a brake pressure;
   a pressure container connector for connecting the control apparatus to a pressure container to provide a supply pressure; and
   a pressure limiting valve between the control valve and the pressure container connector to limit the supply pressure which prevails at the pressure container connector to the brake pressure, so that the actuable control valve is loadable with the brake pressure via the pressure limiting valve;
   wherein the control apparatus is connected to the at least one brake device via a brake device connector,
   wherein the pressure limiting valve includes a control valve connector, via which the pressure limiting valve is connected to the actuable control valve,
   wherein the actuable control valve is configured to shut off the control valve connector in a rest position so that forwarding of the brake pressure to the brake device connector is prevented, and wherein the actuable control valve is configured to open the brake device connector at the same time as the control valve connector is shut off,
   wherein the control valve includes a solenoid valve, which includes a spring-returned solenoid valve having a spring, and wherein in the rest position of the control valve, the spring has a greater length than in an operating position, and the control valve connector is disconnected fluidically from the brake device connector, and
   wherein the pressure limiting valve is integrated so as to output a supply pressure which is reduced via a traction control system (ASR) or an electronic stability and protection system (ESP),
   wherein the solenoid valve, which is returnable by the spring, is a relay valve for the traction control system, and is configured to forward a brake pressure to the at least one brake device of the brake system,
   wherein the pressure limiting valve is part of a supply line of the brake system, and wherein the supply line connects the pressure container to the control valve,
   wherein in the operating position of the control valve, the control valve connector and the brake device connector are connected fluidically by the control valve, so that the brake pressure which is provided by the pressure limiting valve is forwarded to the brake device via the control valve, so that the brake device is loaded with the brake pressure and is actuated,
   wherein the pressure limiting valve is arranged in the supply line of the control valve, so that the pressure limiting valve opens only above a particular pressure, as a result of which the particular pressure is deducted from a supply pressure when the control valve is switched on, so that the output brake pressure is lower than the supply pressure by the particular pressure, and
   wherein the pressure limiting valve is integrated into a front axle controller or a rear axle controller in a region of a store supply arrangement of a magnet assembly for traction control, for outputting the supply pressure which is reduced by the particular pressure via the ASR, the ESP, or an autonomous cruise control system (ACC).

2. The control apparatus of claim 1, wherein the pressure limiting valve includes a check valve.

3. The control apparatus of claim 1, further comprising:
   an actuating device connector for connecting the control apparatus to an actuating device for actuating the brake system by a driver of the vehicle, the control valve being configured to connect the actuating device connector and the brake device connector to one another fluidically in the rest position and/or to disconnect them from one another fluidically in an operating position.

4. The control apparatus of claim 3, wherein the control valve is configured to shut off the actuating device connector in the operating position.

5. The control apparatus of claim 1, wherein the control valve includes two solenoid valves.

6. The control apparatus of claim 1, wherein the pressure limiting valve includes a check valve, which includes a spring-loaded check valve.

7. The control apparatus of claim 1, wherein the brake device connector connects the control apparatus to at least one brake device of the brake system, the control valve connector of the pressure limiting valve connecting the pressure limiting valve to the control valve, and the control valve connecting the control valve connector and the brake device connector to one another fluidically in an operating position and/or to disconnect them from one another fluidically in a rest position.

8. A brake system for a vehicle, comprising:
   at least one pressure container for providing a supply pressure; and
   a control apparatus connected to the pressure container;
   wherein the control apparatus includes:
      an electrically actuable control valve for loading at least one brake device of the brake system with a brake pressure;
      a pressure container connector for connecting the control apparatus to a pressure container to provide a supply pressure; and
      a pressure limiting valve between the control valve and the pressure container connector to limit the supply pressure which prevails at the pressure container connector to the brake pressure, so that the actuable control valve is loadable with the brake pressure via the pressure limiting valve;
      wherein the control apparatus is connected to the at least one brake device via a brake device connector,
      wherein the pressure limiting valve includes a control valve connector, via which the pressure limiting valve is connected to the actuable control valve,
      wherein the actuable control valve is configured to shut off the control valve connector in a rest position so that forwarding of the brake pressure to the brake device connector is prevented, and wherein the actuable control valve is configured to open the brake device connector at the same time as the control valve connector is shut off,
      wherein the control valve includes a solenoid valve, which includes a spring- returned solenoid valve having a spring, and wherein in the rest position of the control valve, the spring has a greater length than in an operating position, and the control valve connector is disconnected fluidically from the brake device connector, and wherein the pressure limiting valve is integrated so as to output a supply pressure which is reduced via a traction control system (ASR) or an electronic stability and protection system (ESP), wherein the solenoid valve, which is returnable by the spring, is a relay valve for the traction control system, and is configured to forward a brake pressure to the at least one brake device of the brake system, wherein the pressure limiting valve is part of a supply line of the brake system, and wherein the supply line connects the pressure container to the control valve, wherein in the operating position of the control valve, the control valve connector and the brake device connector are connected fluidically by the control valve, so that the brake pressure which is provided by the pressure limiting valve is forwarded to the brake device via the control valve, so that the brake device is loaded with the brake pressure and is actuated, wherein the pressure limiting valve is arranged in the supply line of the control valve, so that the pressure limiting valve opens only above a particular pressure, as a result of which the particular pressure is deducted from a supply pressure when the control valve is switched on, so that the output brake pressure is lower than the supply pressure by the particular pressure, and wherein the pressure limiting valve is integrated into a front axle controller or a rear axle controller in a region of a store supply arrangement of a magnet assembly for traction control, for outputting the supply pressure which is reduced by the particular pressure via the ASR, the ESP, or an autonomous cruise control system (ACC).

9. A method for operating a control apparatus of a vehicle, the method comprising:

reading a sensor signal which is provided by at least one sensor of the vehicle; and generating an actuating signal for actuating an actuable control valve using the sensor signal;

wherein the control apparatus includes:

the electrically actuable control valve for loading at least one brake device of the brake system with a brake pressure;

a pressure container connector for connecting the control apparatus to a pressure container to provide a supply pressure; and a pressure limiting valve between the control valve and the pressure container connector to limit the supply pressure which prevails at the pressure container connector to the brake pressure, so that the actuable control valve is loadable with the brake pressure via the pressure limiting valve;

wherein the control apparatus is connected to the at least one brake device via a brake device connector, wherein the pressure limiting valve includes a control valve connector, via which the pressure limiting valve is connected to the actuable control valve, wherein the actuable control valve is configured to shut off the control valve connector in a rest position so that forwarding of the brake pressure to the brake device connector is prevented, and wherein the actuable control valve is configured to open the brake device connector at the same time as the control valve connector is shut off, wherein the control valve includes a solenoid valve, which includes a spring-returned solenoid valve having a spring, and wherein in the rest position of the control valve, the spring has a greater length than in an operating position, and the control valve connector is disconnected fluidically from the brake device connector, and wherein the pressure limiting valve is integrated so as to output a supply pressure which is reduced via a traction control system (ASR) or an electronic stability and protection system (ESP), wherein the solenoid valve, which is returnable by the spring, is a relay valve for the traction control system, and is configured to forward a brake pressure to the at least one brake device of the brake system, wherein the pressure limiting valve is part of a supply line of the brake system, and wherein the supply line connects the pressure container to the control valve, wherein in the operating position of the control valve, the control valve connector and the brake device connector are connected fluidically by the control valve, so that the brake pressure which is provided by the pressure limiting valve is forwarded to the brake device via the control valve, so that the brake device is loaded with the brake pressure and is actuated, wherein the pressure limiting valve is arranged in the supply line of the control valve, so that the pressure limiting valve opens only above a particular pressure, as a result of which the particular pressure is deducted from a supply pressure when the control valve is switched on, so that the output brake pressure is lower than the supply pressure by the particular pressure, and wherein the pressure limiting valve is integrated into a front axle controller or a rear axle controller in a region of a store supply arrangement of a magnet assembly for traction control, for outputting the supply pressure which is reduced by the particular pressure via the ASR, the ESP, or an autonomous cruise control system (ACC).

10. A method for loading at least one brake device of a brake system for a vehicle with a brake pressure, the method comprising:

providing a supply pressure at a pressure container connector;

limiting the supply pressure to the brake pressure by a pressure limiting valve ; and actuating an electrically actuable control valve to load the brake device with the brake pressure;

wherein the brake system includes a control apparatus with the electrically actuable control valve, the pressure container connector for connecting the control apparatus to a pressure container, and the pressure limiting valve which is between the control valve and the pressure container connector to limit the supply pressure which prevails at the pressure container connector to the brake pressure, so that the actuable control valve is loadable with the brake pressure via the pressure limiting valve, wherein the control apparatus is connected to the at least one brake device via a brake device connector, wherein the pressure limiting valve includes a control valve connector, via which the pressure limiting valve is connected to the actuable control valve, wherein the actuable control valve is configured to shut off the control valve connector in a rest position so that forwarding of the brake pressure to the brake device connector is prevented, and wherein the actuable control valve is configured to open the brake device connector at the same time as the control valve connector is shut off, wherein the control valve includes a solenoid valve, which includes a spring-returned solenoid valve having a spring, and wherein in the rest position of the control valve, the spring has a greater length than in an operating position, and the control valve connector is disconnected fluidically from the brake device connector, and wherein the pressure limiting valve is integrated so as to output a supply pressure which is reduced via a traction control system (ASR) or an electronic stability and protection system (ESP), wherein the solenoid valve, which is returnable by the spring, is a relay valve for the traction control system, and is configured to forward a brake pressure to the at least one brake device of the brake system, wherein the pressure limiting valve is part of a supply line of the brake system, and wherein the supply line connects the pressure container to the control valve, wherein in the operating position of the control valve, the control valve connector and the brake device connector are connected fluidically by the control valve, so that the brake pressure which is provided by the pressure limiting valve is forwarded to the brake device via the control valve, so that the brake device is loaded with the brake pressure and is actuated, wherein the pressure limiting valve is arranged in the supply line of the control valve, so that the pressure limiting valve opens only above a particular pressure, as a result of which the particular pressure is deducted from a supply pressure when the control valve is switched on, so that the output brake pressure is lower than the supply pressure by the particular pressure, and wherein the pressure limiting valve is integrated into a front axle controller or a rear axle controller in a region of a store supply arrangement of a magnet assembly for traction control, for outputting the supply pressure which is reduced by the particular pressure via the ASR, the ESP, or an autonomous cruise control system (ACC).

* * * * *